US006558434B1

(12) United States Patent
Furrer et al.

(10) Patent No.: US 6,558,434 B1
(45) Date of Patent: May 6, 2003

(54) METHOD FOR COOLING BY ALTERING CRYSTAL FIELD INTERACTION

(76) Inventors: Albert Furrer, Rebhalde 13, CH-8166 Niederweningen (CH); Karl Alexander Müller, Haldenstrasse 54, CH-8908 Hedingen (CH); Joël Mesot, Chileacherstrasse 19, CH-5272 Gansingen (CH)

( * ) Notice: Subject to any disclaimer, the term of this patent is extended or adjusted under 35 U.S.C. 154(b) by 0 days.

(21) Appl. No.: 09/581,150

(22) PCT Filed: Nov. 25, 1998

(86) PCT No.: PCT/IB98/01879

§ 371 (c)(1), (2), (4) Date: Sep. 5, 2000

(87) PCT Pub. No.: WO99/27313

PCT Pub. Date: Jun. 3, 1999

(30) Foreign Application Priority Data

Nov. 26, 1997 (CH) ............................................. 2730/97

(51) Int. Cl.$^{7}$ .................................................. B01D 9/00

(52) U.S. Cl. .................... 23/296; 23/295 R; 23/305 RE

(58) Field of Search ........................... 23/295 R, 293 R, 23/300, 296, 305 RE, 305 A

(56) References Cited

U.S. PATENT DOCUMENTS 4,512,846 A * 4/1985 Shlichta ....................... 117/69
5,409,505 A * 4/1995 Morita et al. .......... 165/104.21

OTHER PUBLICATIONS

Muller et al., Aug. 1998, Applied Physics Letters, vol. 73, No. 8, pp. 1056–1058.*

* cited by examiner

*Primary Examiner*—Stanley C. Silverman
*Assistant Examiner*—Edward M. Johnson
(74) *Attorney, Agent, or Firm*—Lisa N. Benado; Janet Sleath

(57) ABSTRACT

A method for cooling is provided which makes use of materials which undergo a pressure induced structural phase transition such that the material's crystal field interaction changes, and which colds down during this phase transition. This effect is used for cooling objects which are thermally coupled to the material.

19 Claims, 4 Drawing Sheets

METHOD FOR COOLING BY ALTERING CRYSTAL FIELD INTERACTION

TECHNICAL FIELD

Figure 1:
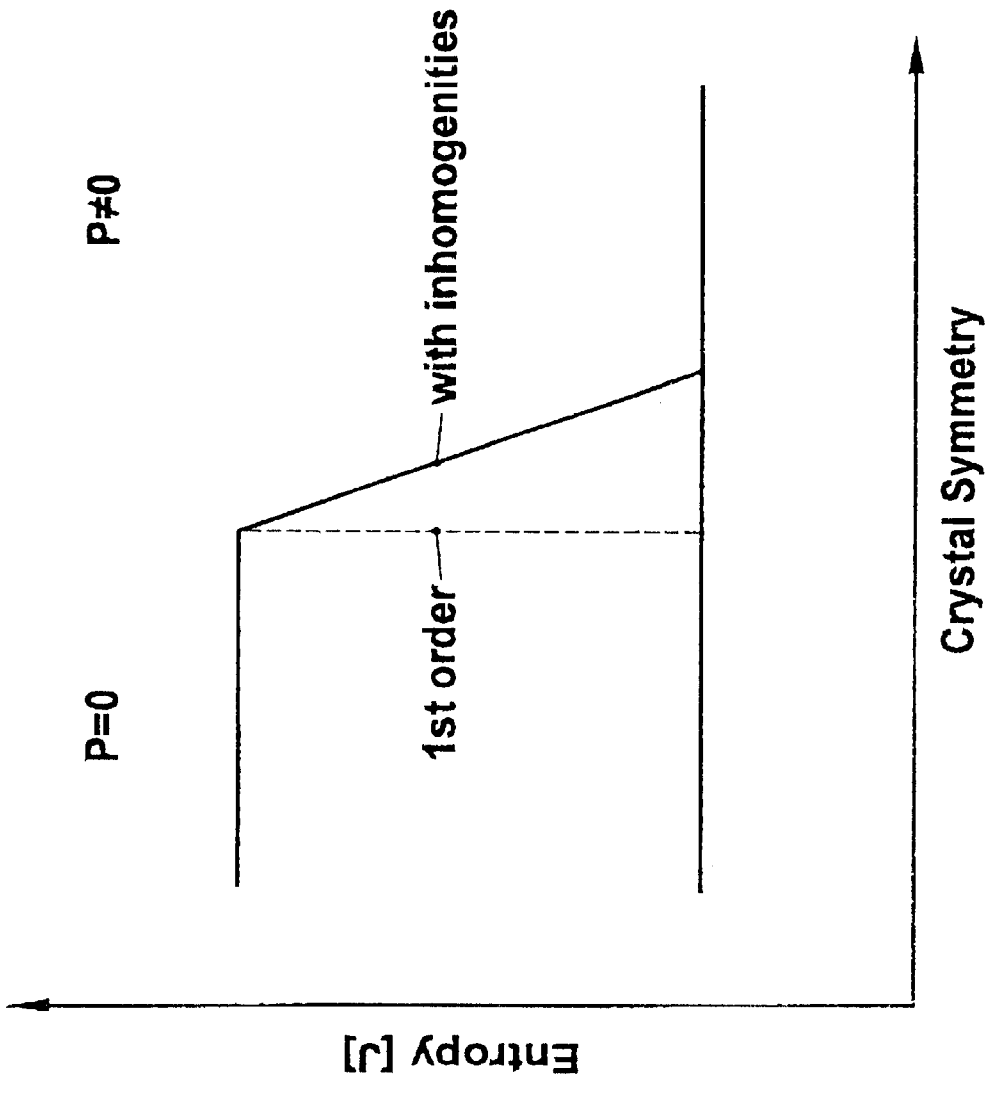

The present patent application concerns a method for cooling. The cooling is achieved by a pressure-induced phase transition whereby the crystal field interaction is altered.

TECHNICAL BACKGROUND

Different technical approaches are employed in science and technology for cooling samples and other objects. Depending on the area of application the below physical effects—beneath others—are being made use of:

evaporation of liquids on surfaces;

Peltier-effect;

adiabatic expansion of gas; and adiabatic demagnetization;

Details concerning the adiabatic demagnetization are for example given on pages 472 and following of the German book with title "Einführung in die Festkörperphysik", by Ch. Kittel, 8th revised edition, published by R. Oldenburg Verlag GmbH, Germany. The adiabatic demagnetization is also addressed in Ch. Kittel's book "Introduction to Solid State Physics", 3rd edition, Wiley, New York, London, Sidney, 1967, chapter 14, p 440 and FIG. 8. The other effects/techniques are well known and addressed in-depth in the appropriate literature, too.

Liquid gases are employed for cooling objects as well. The mentioned physical effects and the respective methods for cooling and the apparatus for cooling which are based thereon are either limited to a narrow temperature range, or the associated technical effort is rather big. The associated technical effort may lead to increased costs of the method for cooling and the corresponding apparatus. Furthermore, a big effort is required to gain control of inherent security risks.

Explanations of these known cooling methods and apparatus can be found in the appropriate technical literature. The technical literature is not listed herein since the following invention deviates to a great extent from any of the known approaches and a detailed discussion of the known methods is not relevant for the understanding of the present invention.

S. G. Rosenkranz describes in his German Ph.D thesis with title "Neutronendiffraktion und Neutronenspektroskopie an Seltenen Erd-Nickelaten $RNiO_3$ (R=Seltene Erde)", ETH Zurich, Ph.D. thesis ETH No. 11853, 1996, Switzerland, that certain rare earth nickelates undergo a structural change if an external pressure is applied. This Ph.D thesis mainly concerns the experimental investigation and theoretical discussion of the temperature dependence of the phase transition (change of the symmetry of the crystal field) and structural changes of crystals.

Structural changes of so-called Laves-phases were described for the first time by O. E. Martin and K. Girgis in J. Magn. Magn. Mater., Vol. 37, p. 228–230, 1983.

OBJECTS OF THE INVENTION

It is an object of the invention to develop a simple method for the cooling of objects and an apparatus being based thereon.

The method and the apparatus based thereon shall be inherently secure and its realization shall be possible with acceptable effort and at low cost.

SUMMARY OF THE INVENTION

The objects of the invention have been accomplished by a method and apparatus making use of special materials, the crystal symmetry of which changes if pressure is applied or reduced such that a structural phase transition occurs where the material's crystal field interaction is altered. The crystal field interaction might either be altered by a transition from a state with strong degeneracy of the crystal field to a state with reduced degeneracy of the crystal field, or it might be altered such that the overall crystal field splitting is changed. The special material cools down during this transition. The cooling effect can be employed to cool objects which are thermally coupled to the special material.

In principle, all materials are suited for use in the present context which comprise ions or atoms which show at a certain crystal symmetry a degenerate crystal field of their deepest levels and which undergo a pressure-induced phase transition towards a state with reduced or removed degeneracy of the crystal field. This phase transition is pressure induced and can be caused by an isotropic and/or uniaxial pressure application or depressurization. Well suited materials are rare earth compounds such as rare earth nickelates, rare earth manganates, rare earth aluminates, for example, as well as other transition metal oxides which show a phase transition if pressure is increased or reduced and which as a result cool down. Also suited are materials which undergo a pressure-induced phase transition whereby the degeneracy of the crystal field is not reduced or removed, but the overall crystal field splitting is changed. Alloys of a rare earth (R) and metals, such as Aluminum (Al) and Gallium (Ga), for example, are materials which show such a behavior. The so-called "Laves phases" $RAl_{2-x}Ga_x$ (R=Nd, Er; $0 \leqq x \leqq 2$) are an example of a well suited material.

These effects were not known until now and have not been used technically despite the fact that rare earth nickelates had been made and analyzed for the first time more than twenty years ago. S. G. Rosenkranz has observed in connection with the above-mentioned Ph.D thesis for the first time that certain rare earth nickelates undergo a structural change if an external pressure is applied. The structural changes of Laves phases have been described by O. E. Martin and K. Girgis in the above-mentioned publication in 1983. The present invention is based on the work by S. G. Rosenkranz as well as by O. E. Martin and K. Girgis.

The invention is furthermore based on the observation that a controlled phase transition occurs if a pressure is applied, or if the pressure is reduced (depressurization). In addition, the present invention makes use of the fact that the entropy changes with the phase transition and that a controllable cooling can thus be achieved.

It is an advantage of the method for cooling and the apparatus based thereon, as claimed, that it can be used in a temperature range between $0<T\leqq 600$ Kelvin ($-273<T\leqq 327$ degree centigrade).

It is a further advantage that the inventive method for cooling can be optimized across the entire temperature range by modifying the chemical composition of the materials utilized.

DRAWINGS

Figure 2:
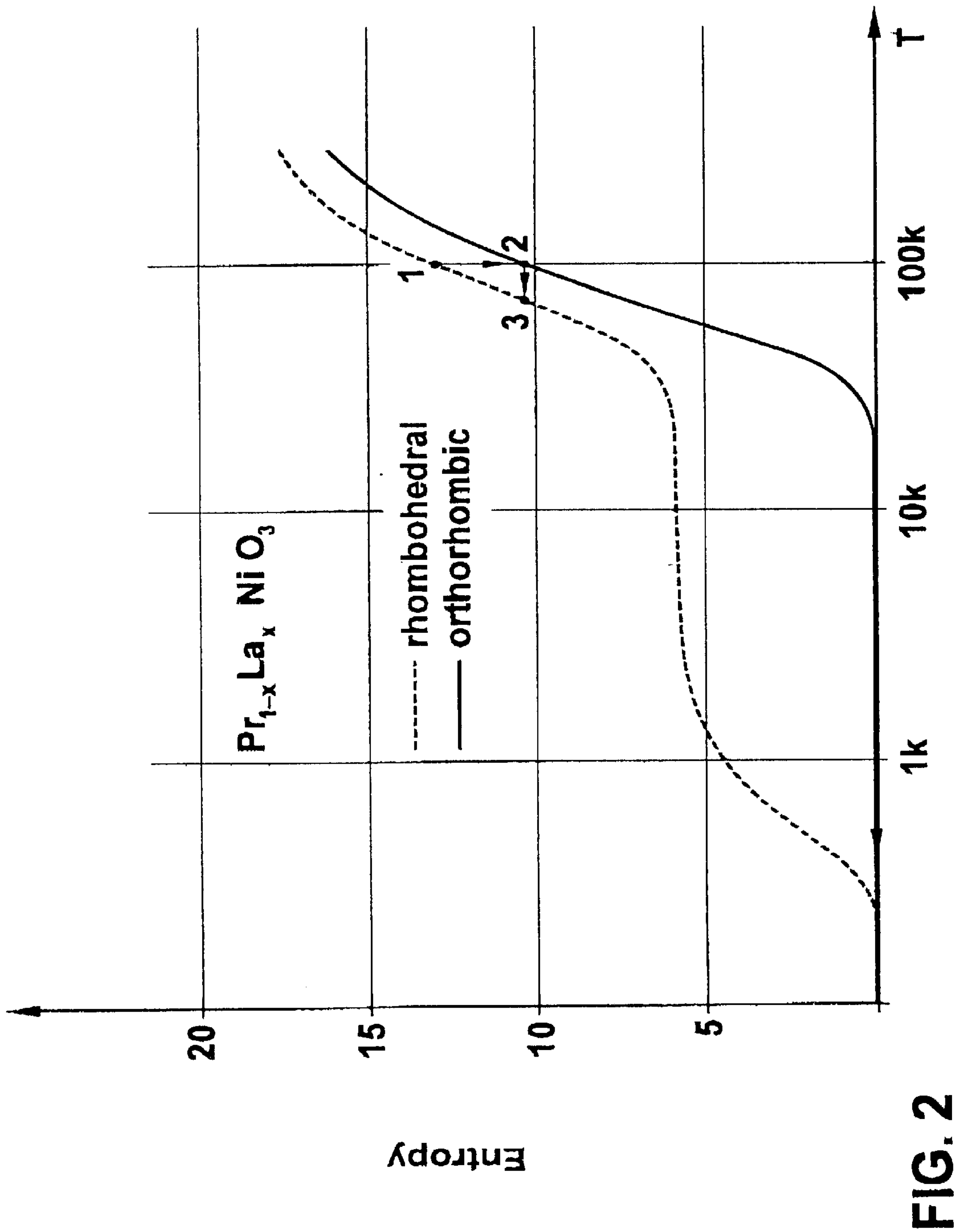
Figure 3:
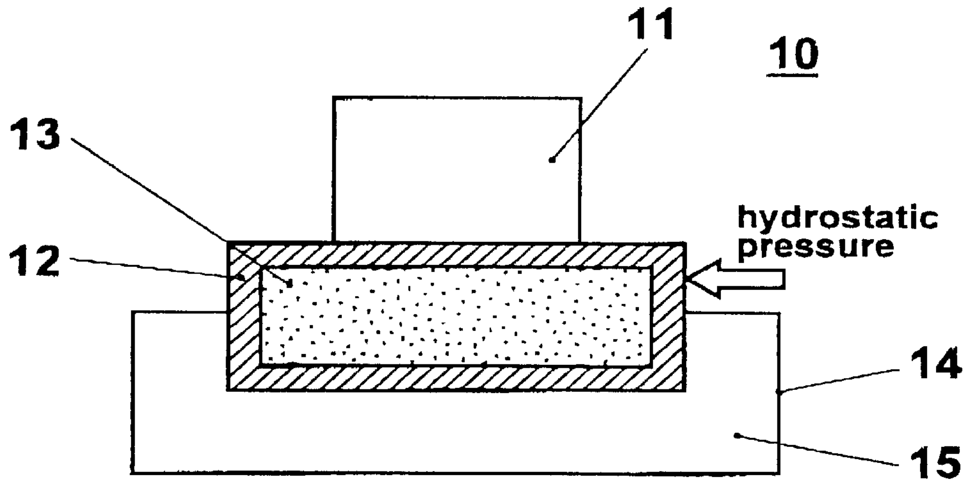
Figure 4:
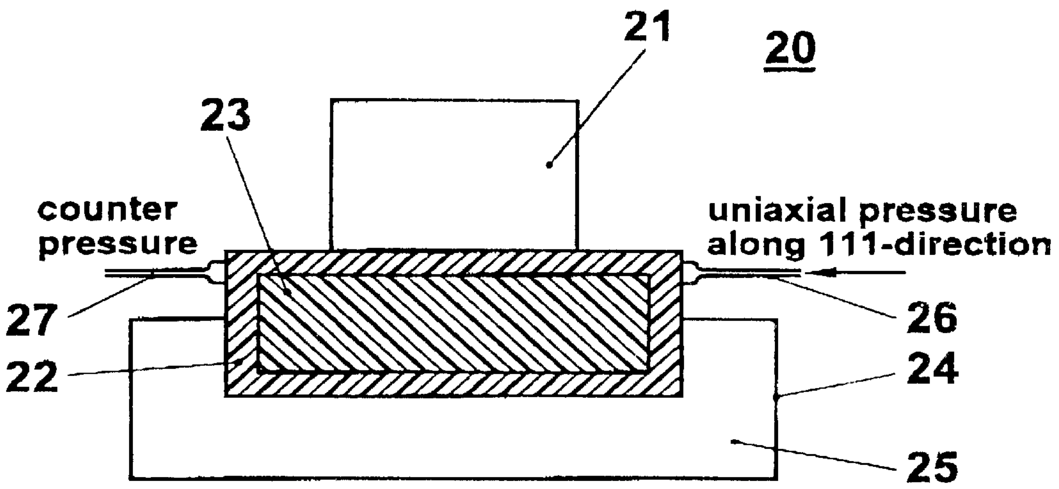
Figure 5:
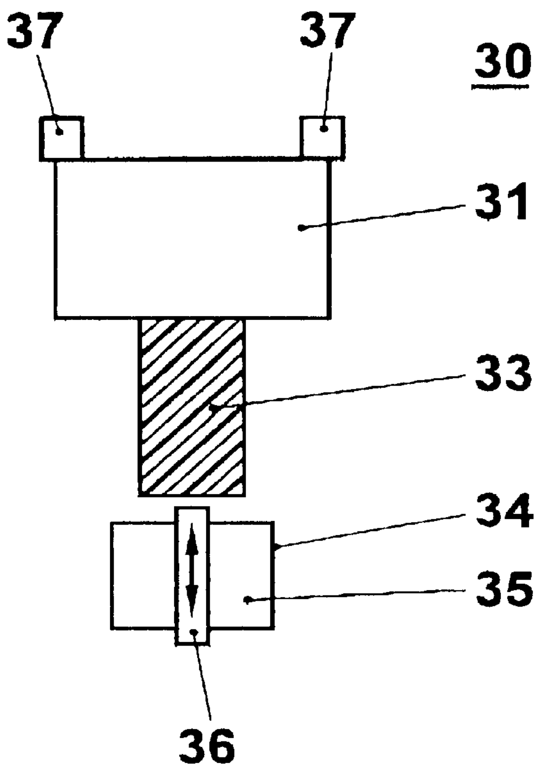

The invention is described in connection with the below schematic drawings in which:

FIG. 1 is a schematic representation of the transition from a state with low entropy (J) to a state with higher entropy which occurs if a pressure (P) is applied, FIG. 2 is a logarithmic representation which illustrates the entropy's (J) temperature dependence of the two crystallographic states, given here for $Pr_{1-x}La_xNiO_3$ ($0\leqq x\leqq 1$), FIG. 3 is a schematic sketch of an apparatus for cooling according to the present invention, FIG. 4 is a schematic sketch of another apparatus for cooling according to the present invention, and FIG. 5 is a schematic sketch of yet another apparatus for cooling according to the present invention.

DESCRIPTION OF THE INVENTION

Before details of the present invention are addressed, those expressions are defined and—where appropriate—explained which are crucial for a better understanding of the invention.

The expression "object" is used as a synonym for samples, work pieces, substances (e.g. chemical substances) and so forth. The expression "object" furthermore includes electronic circuits (such as computer chips), metal conductors and the like, biological substances, chemical materials which are to be cooled or cooled down.

For sake of convenience the expression "pressurization" is herein used to describe a step where the pressure P1 is applied to the material for cooling (with P1><0). Note that the pressure is actually reduced if a negative pressure is applied. For sake of simplicity the tension is herein deemed to be a negative pressure.

After the pressurization a so-called "depressurization" follows. The depressurization depends on the pressurization step. i.e., if during the pressurization the pressure is increased by P1 (i.e. P1>0), then during the depressurization the pressure is reduced by application of a pressure P2 with |P1|=|P2| and P2<0, or if during a first step the pressure is reduced by P1 (i.e. P1<0), then during the depressurization the pressure is increased by application of a pressure P2 with |P1|=|P2| and P2>0. In other words, during the depressurization step the pressure returns to its original pressure or to a pressure which is close to the original pressure.

For a realization of the present invention all materials are suited which comprise ions or atoms which show at a certain crystal symmetry a crystal field degeneracy of their deepest levels and which undergo a pressure dependent phase transition whereby the degeneracy of the crystal field is reduced or removed completely. The phase transition may be caused by application of an isotropic and/or uniaxial pressure. Well suited materials are rare earth compounds such as rare earth nickelates, rare earth manganates, rare earth aluminates, for example, and other transition metal oxides which show a phase transition if pressure is increased or reduced and which as a result cool down. Also suited are materials which undergo a pressure-induced phase transition whereby the degeneracy of the crystal field is not reduced or removed, but the overall crystal field splitting is changed. Alloys of a rare earth (R) and metals, such as Aluminum (Al) and Gallium (Ga), for example, are materials which show such a behavior. The so-called Laves phases $RAl_{2-x}Ga_x$ (R=Nd, Er; $0 \leqq x \leqq 2$) are an example of a well suited material.

For sake of simplicity these materials are herein referred to as materials for cooling.

In other words, materials for cooling are those materials which undergo a change in their crystal field interaction if a pressure is applied or if the pressure is reduced/removed. Their behavior is schematically depicted in FIG. 1. The crystal field levels at a pressure P=0 and a pressure $P \geqq 0$ are illustrated in this Figure. A first order phase transition occurs between a state with two crystal field levels (degenerate state) to a state of reduced crystal field degeneracy. This transition is illustrated as dashed line. If, for example, inhomogenities or special symmetries are present in the material for cooling, a continuous transition (see solid line) occurs.

The following rare earth compounds, beneath others, are suited for use in connection with the present invention as materials for cooling. Particularly well suited are rare earth compounds of the listed rare earth (R=rare earth): Pr, Eu, Tb, Ho, and Tm. Examples of such rare earth compounds are:

- rare earth nickelates $RNiO_3$, such as $PrNiO_3$ (praseodynium) for instance,
- $R_2BaNiO_5$ family,
- rare earth manganates $RMnO_3$;
- rare earth aluminates $RAlO_3$;
- other transition metal oxides; and
- alloys of so-called Laves phases $RAl_{2-x}Ga_x$.

Also suited are mixed crystalline compounds of two or more of the mentioned rare earth compounds, such as $(La,Pr)NiO_3$ or $(La,Gd)AlO_3$, as well as mixed compositions or crystals of the mentioned rare earth compounds with the mentioned alloys, or with other elements and compounds.

There are different approaches for making rare earth compounds. According to the Demaseau-process, for example, a mixture of pure oxide $R_2O_3$ and NiO is heated up to a temperature of about 950 degree centigrade together with $KClO_3$ in a closed chamber and a Belt-type generator at a pressure of 60 kbar. Making rare earth compounds using the Demaseau-process was described for the first time by G. Demaseau et al. in J. Solid State Chem., Vol. 3, p. 582, 1971.

More recent methods for making rare earth compounds operate at a lower pressure. It is possible, for example, to use the sol-gel reaction. This method is described in detail by J. Vassiliou in J. Solid State Chem., Vol. 81, p. 208, 1989.

The rare earth nickelates and other rare earth compounds can be made in the form of powder or as single crystals, whereby the manufacturing or single crystalline material is much more difficult. It is conceivable to use mixtures of the different materials for cooling in connection with the present invention.

Alloys of the so-called Laves phases, e.g. $RAl_{2-x}Ga_x$, can be made by melting the ingredients in an arc. This step is then followed by a sinter process to obtain a powder. Zone melting is employed to obtain single crystalline Laves phases. $PrNiO_3$ is addressed hereinafter. $PrNiO_3$ is representative of all the other materials for cooling. These other materials can be used instead.

$PrNiO_3$ belongs to the group of the perovskite-like transition metal oxides. This compound shows a crystallographic transition from a rhombohedral structure to an orthorhombic structure at a temperature of T=600 Kelvin (=327 degree centigrade). During this phase transition—which ideally is a 1st order transition—a sudden change of the material's electronic structure occurs. During this transition the twofold degeneracy of the electronic ground state of the $Pr^{3+}$ is removed. This change of the symmetry of the electronic ground state causes a sharp change of the free energy. This means in other words that the entropy (J) is reduced during the phase transition. The entropy is a measure of the disorder in a system: the larger the disorder, the larger the entropy. The free energy decreases by about −0.8 meV per lattice cell unit. Some embodiments of the present method and apparatus are based on exactly this mechanism, which also show in connection with other materials.

It is important to mention as well that such a phase transition is pressure-induced, i.e. it can be caused by applying a pressure to the material for cooling, or by reducing the pressure (depressurization). In this connection reference is made to FIG. 1. During the pressure-induced phase transition an energy of about −0.8 meV per formula unit becomes available such that the material for cooling cools down. Recent experiments actually revealed a cooling of the compound $Pr_{0.66}La_{0.34}NiO_3$, as reported by K. A. Muller, F. Fauth, St. Fischer, M. Koch, and A. Furrer in "Cooling by adiabatic pressure application in $Pr_{1-x}La_xNiO_3$", Appl. Phys. Lett, Vol. 73, pp. 1056–1058, 1998.

Other embodiments might be based on the effect that is observed if a pressure is applied to a Laves phase structure. This also works if the Laves phase structure is depressurized.

The temperature of the phase transition can be controlled or influenced by the chemical composition of the material for cooling. The phase transition of $Pr_{1-x}La_xNiO_3$ ($0 \leqq x \leqq 1$) can be gradually reduced from 600 Kelvin to 0 Kelvin by replacing Pr with La. This allows to tailor the material for cooling as required. The mixed compound $Pr_{1-x}La_xNiO_3$, for example, can be employed in the whole temperature range below 600 Kelvin.

It is another advantageous characteristic of $Pr_{1-x}La_xNiO_3$ ($0 \leqq x \leqq 1$) and other materials for cooling that they are metallic conductors. Due to this the temperature distribution remains homogeneous. In addition, the thermal conductivity which is related to the metallic conductivity allows an outstanding thermal coupling with the object that has to be cooled.

The temperature dependence of the entropy (J) at both crystallographic states is illustrated in FIG. 2. Note that the entropy is correlated to the free energy. This is illustrated in FIG. 2 and can be used for the purpose of explaining the method for cooling according to the present invention.

The method for cooling is now described with reference to FIG. 2. The method for cooling is carried out step-by-step. In the present example the number of steps is two.

1st Step (From Point 1 to Point 2):

We assume that the $Pr_{1-x}La_xNiO_3$ is in a rhombohedral state (at point 1) at a temperature of 100 Kelvin. This state is illustrated in FIG. 2 by means of a dashed line. By application of an external pressure (P) at a temperature that is kept essentially constant (in other words, this step is essentially isothermal), the entropy (J) decreases to its value at the orthorhombic state. I.e., one reaches point 2. The orthorhombic state is illustrated in FIG. 2 as a solid line. The temperature might be kept constant by providing contact with a thermal bath, for example. The entropy (J) decreases during this step.

2nd Step (From Point 2 to Point 3):

After having decoupled the material for cooling from the thermal bath, an adiabatic depressurization occurs, i.e. the external pressure is reduced to zero (P=0). Due to this, the material for cooling undergoes a first order phase transition and returns to the rhombohedral state (point 3). It cools down to 71 Kelvin during this phase transition and a cooling down of 29 Kelvin (100 Kelvin−71 Kelvin) is achieved.

The method for cooling might be stopped right after the second step. The material for cooling as well as on object being thermally coupled therewith both were cooled down by about 29 Kelvin.

It is interesting that the rare earth nickelates as well as some other materials for cooling undergo a change of their unit cell volume (about 0.1%) during the transition from the orthorhombic state to the rhombohedral state. The length changes during the structural phase transition. This effect can be used in a clever way to achieve an automatic decoupling from the thermal bath, if employed.

Note that the above two steps can also be carried out in reverse order. In this case one starts with the adiabatic depressurization followed by an essentially isothermal pressurization.

An apparatus is now addressed which is based on the inventive method for cooling.

The pressure (or tension) which is required to obtain a phase transition might either be applied as external pressure (or tension) parallel to the rare earth nickelate's 111-direction (uniaxial), or a hydrostatic (isotropic) pressure (or tension).

A first apparatus for cooling is illustrated in FIG. 3. A hydrostatic pressure increase might be achieved by building up a hydraulic pressure, for example. The hydraulic pressure might interact with the closed container 12 (e.g. a pressure cell) which comprises a powder-like material for cooling 13. If one mixes the power-like material for cooling 13 (e.g. a rare earth nickelate) with a liquid and puts both together in the closed container 12, then the externally applied hydraulic pressure is converted into a hydrostatic pressure inside the container 12. With this approach a hydrostatic pressure of more than 25 kbar can be reached. The cooling of the material for cooling 13 is transferred on to the object 11 which is to be cooled during the adiabatic depressurization. The material for cooling 13 is thermally coupled to a thermal bath 14 during the step where a pressure is applied to the container 12. This thermal bath 14 might be filled with a thermally conductive liquid, for example. The container 12 might be decoupled from the thermal bath 14 during the adiabatic depressurization. This can be achieved by a small movement of the thermal bath 14, for example.

A further apparatus for cooling 20 is shown in FIG. 4. This apparatus 20 differs from the one described in connection with FIG. 3 in that a crystalline or ceramic material for cooling 23 is employed. This material for cooling 23 is situated inside a suitable container 22. The object 21 which is to be cooled is thermally coupled to the container 22 to ensure an efficient transfer of the cold from the material for cooling 23 to the object 21. Again, the container 22 is situated in a thermal bath 24 which is filled with a liquid 25. In the present example a uniaxial pressure interacts with the crystal 23 so that it undergoes a transition from a state where the crystal field is degenerate to a state with reduced degeneracy of the crystal field. This pressure can be applied by means of a stamp 26 or pestle, for example. This stamp 26 can be moved, as indicated by an arrow. It is to be ensured that the apparatus does not make way if the pressure is applied. A second stamp 27, for example, might be situated at the opposite end to prevent this. During this step the temperature of the crystal 23 is kept essentially constant due to its being in contact with the thermal bath 24. In other words, this step is essentially isothermal. Now a step of adiabatic depressurization follows. During this step the material for cooling 23 is decoupled from the thermal bath 24 and the cooling of the material for cooling 23 is transferred onto the object 21.

Another apparatus for cooling is shown in FIG. 5. In this embodiment the pressure is applied to the material for cooling 33 by means of a stamp 36. This stamp 36 can be moved up and down, as schematically shown by the double arrow. A thermal bath 34 filled with a liquid for cooling 35, encloses the stamp 36. If the stamp 36 is moved upwards for application of a pressure to the material for cooling 33, a thermal coupling with the thermal bath 34 is obtained at the same time.

For adiabatic depressurization of the material for cooling 33 the stamp 36 is simply moved down to remove or reduce the pressure. Simultaneously, the material for cooling 33 is decoupled from the thermal bath 34. The object 31 which is to be cooled is thermally decoupled from an enclosure (not shown in FIG. 5). This can be achieved by small blocks 37.

What is claimed is:

1. A method for cooling comprising the following steps:

applying a pressure P1 to a material for cooling, while keeping the temperature of said material for cooling essentially constant such that a phase transition from a first crystal state to a second crystal state occurs during which crystal field interaction of said material for cooling is altered, performing an adiabatic depressurization by application of a positive pressure P2 if the pressure P1 is negative, or a negative pressure P2 if the pressure P1 is positive, to said material for cooling to bring it back to or close to said first crystal state whereby the temperature of said material for cooling decreases.

2. The method of claim 1, wherein at least part of said material for cooling has a degenerate crystal field in said first crystal state, and whereby at least part of said material for cooling has a less degenerate crystal field in said second crystal state.

3. The method of claim 2, wherein the application of the pressure P1 is performed such that at least part of said material for cooling has a nondegenerate crystal field in said second crystal state.

4. The method of claim 1, wherein an object is thermally coupled with said material for cooling such that said object is cooled down.

5. The method of 1, further comprising the step of: transferring coldness, which is provided during the adiabatic depressurization, to an object which is to be cooled.

6. The method of claim 1, wherein during the application of the pressure P1 said material for cooling is thermally coupled to a thermal bath to keep the temperature essentially constant.

7. The method of claim 6, wherein said material for cooling is decoupled from said thermal bath during the adiabatic depressurization.

8. The method of claim 1, wherein said material for cooling comprises a rare earth compound.

9. The method of claim 8, wherein the rare earth compound is selected from the group consisting of: rare earth nickelates, rare earth manganates, rare earth aluminates.

10. The method of claim 1, wherein at said first crystal state a crystal field of said material for cooling is split-up and wherein at said second crystal state a splitting of said crystal field is altered.

11. The method of claim 10 wherein said material for cooling comprises an alloy of a rare earth with at least two metals.

12. The method of claim 11, wherein said alloy of a rare earth with at least two metals is a Laves phase.

13. The method of claim 10, whereby said material for cooling comprises $RAl_{2-x}Ga_x$ wherein R=Nd or Er and $O \leqq x \leqq 2$.

14. The method of claim 1, wherein said material for cooling comprises a transition metal oxide.

15. The method of claim 1, wherein said material for cooling comprises a mixture of at least two materials for cooling.

16. The method of claim 1, wherein the entropy of said material for cooling decreases during the application of the pressure P1.

17. The method of claim 1, wherein at least part of said material for cooling is rhombohedral in said first crystal state.

18. The method of claim 17, wherein at least part of said material for cooling is transformed into an orthorhombic second crystal state during the application of the pressure P1.

19. The method of claim 1, wherein the application of the pressure P1 is carried out after the adiabatic depressurization.

* * * * *